(12) United States Patent
Zhao et al.

(10) Patent No.: US 11,506,831 B2
(45) Date of Patent: Nov. 22, 2022

(54) BACKLIGHT SOURCE PACKAGING DEVICE

(71) Applicants: Beijing BOE Chatani Electronics Co., Ltd., Beijing (CN); BOE TECHNOLOGY GROUP CO., LTD., Beijing (CN)

(72) Inventors: Xiangwei Zhao, Beijing (CN); Qilin Li, Beijing (CN)

(73) Assignees: Beijing BOE Chatani Electronics Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 334 days.

(21) Appl. No.: 16/811,062

(22) Filed: Mar. 6, 2020

(65) Prior Publication Data
US 2021/0096294 A1 Apr. 1, 2021

(30) Foreign Application Priority Data
Sep. 27, 2019 (CN) .......................... 201921639011.9

(51) Int. Cl.
*B65B 11/04* (2006.01)
*F21V 8/00* (2006.01)
*G06F 1/16* (2006.01)
*G06F 1/18* (2006.01)
*B65B 55/24* (2006.01)

(52) U.S. Cl.
CPC .......... *G02B 6/0065* (2013.01); *B65B 11/045* (2013.01); *B65B 55/24* (2013.01); *G02B 6/0078* (2013.01); *G06F 1/1609* (2013.01); *G06F 1/181* (2013.01)

(58) Field of Classification Search
CPC ......... B65B 11/00; B65B 11/02; B65B 11/04; B65B 11/045; B65B 2210/16
USPC ................................... 53/587, 203, 211, 214
See application file for complete search history.

(56) References Cited

U.S. PATENT DOCUMENTS

| 4,045,135 | A | * | 8/1977 | Doi | ..................... G03G 21/1628 |
| | | | | | 399/318 |
| 4,235,062 | A | * | 11/1980 | Lancaster, III | ....... B65B 11/045 |
| | | | | | 53/399 |
| 4,691,497 | A | * | 9/1987 | Lancaster | ............. B65B 11/045 |
| | | | | | 53/399 |

(Continued)

*Primary Examiner* — Chelsea E Stinson
(74) *Attorney, Agent, or Firm* — Perilla Knox & Hildebrandt LLP; Kenneth A. Knox

(57) ABSTRACT

A backlight source packaging device is provided in the present disclosure, which belongs to the technical field of displays. The backlight source packaging device includes a bracket, a feeding mechanism, a cleaning mechanism, a cutting mechanism and a rotating mechanism, where the feeding mechanism is fixed to the bracket, which is configured to arrange a winding film; the cleaning mechanism is fixed to the bracket, which is configured to clean the winding film; the cutting mechanism is fixed to the bracket, which is configured to cut the winding film; the rotating mechanism is fixed to the bracket, which is configured to drive the backlight source to rotate so that the winding film winds around the backlight source, where the winding film can reach the rotating mechanism from the feeding mechanism successively through the cleaning mechanism and the cutting mechanism.

9 Claims, 5 Drawing Sheets

(56) References Cited

U.S. PATENT DOCUMENTS

2015/0353220 A1* 12/2015 Lancaster, III ....... B65B 11/025
  53/461
2016/0109078 A1* 4/2016 Liu ................... G02F 1/133603
  362/217.17

* cited by examiner

BACKLIGHT SOURCE PACKAGING DEVICE

CROSS REFERENCE TO RELATED APPLICATION

This application is based upon and claims priority to Chinese Patent Application No. 201921639011.9, filed on Sep. 27, 2019, the entire contents thereof are incorporated herein by reference.

TECHNICAL FIELD

The present disclosure relates to the technical field of display and, particularly, relates to a backlight source packaging device.

BACKGROUND

In the field of backlight source packaging, most inner packaging of a backlight source uses the winding film packaging method, which reduces the cost of the inner packaging material and facilitates unpacking. When packaging with the winding film, at least two persons are needed to cooperate with each other to wind the backlight source using several turns. This not only makes the manpower cost of the inner packaging of the backlight source high and provides low efficiency, but also makes the winding form of the inner packaging of the backlight source not uniform.

The above-mentioned information disclosed in the background section is only used to enhance the understanding of the background of the present disclosure, so that it may include information that does not constitute the prior art known to those skilled in the art.

SUMMARY

The present disclosure adopts the following technical solutions:

According to the first aspect of the present disclosure, a backlight source packaging device is provided that includes:
a bracket;
a feeding mechanism fixed to the bracket, configured to arrange a winding film;
a cleaning mechanism fixed to the bracket, configured to clean the winding film;
a cutting mechanism fixed to the bracket, configured to cut the winding film;
a rotating mechanism fixed to the bracket, configured to drive the backlight source to rotate so that the winding film winds around the backlight source; and
where the winding film can reach the rotating mechanism from the feeding mechanism successively through the cleaning mechanism and the cutting mechanism.

In an example embodiment of the present disclosure, the feeding mechanism includes:
a support shaft fixed to bracket, and able to be threaded through a cylinder wound with the winding film;
a supporting seat fixed to one end of the support shaft close to the bracket to support the cylinder, which makes the distance between the cylinder and the bracket to be a preset distance.

In an example embodiment of the present disclosure, the cleaning mechanism includes:
an adhesion roller rotatably fixed to the bracket, configured to be in surface contact with the winding film to adhere the foreign matter on the winding film, and able to rotate under the drive of the winding film.

In an example embodiment of the present disclosure, the cleaning mechanism further includes:
a static electricity eliminating roller rotatably fixed to the bracket, configured to be in surface contact with the winding film to eliminate the static electricity on the winding film, and able to rotate under the drive of the winding film.

In an example embodiment of the present disclosure, the cutting mechanism includes:
a guide component that includes a guide member and a slide member which cooperate with each other, where the guide member is fixed to the bracket, and the slide member is able to move along a preset track under the constraint of the guide member;
a cutting blade arranged on the slide member, configured to move under the drive of the slide member, and able to cut the winding film during the movement.

In an example embodiment of the present disclosure, the cutting mechanism further includes:
a support plate fixed to the bracket, arranged with a support surface configured to contact with the winding film, where the support plate is further arranged with a narrow slit, and the narrow slit divides the support surface into two parts which are not connected; and
the cutting blade is inserted into the narrow slit and is movable within the narrow slit.

In an example embodiment of the present disclosure, the cutting mechanism further includes:
a buffer member arranged at one end of the guide member close to the bracket, configured to isolate the slide member and the bracket.

In an example embodiment of the present disclosure, the rotating mechanism includes:
a rotation driving component fixed to the bracket; and
a support platform fixed to the rotation driving component, and able to rotate under the control of the rotation driving component, where the support platform has a bearing surface for bearing the backlight source.

In an example embodiment of the present disclosure, the backlight source packaging device further includes:
a starting circuit configured to generate a starting signal in response to external operations;
a controller configured to respond to the starting signal, and to control the rotation driving component to drive the support platform to rotate for a preset number of turns and then stop rotating.

In an example embodiment of the present disclosure, the cutting mechanism includes:
an elevator mechanism that includes a power member and a slide member which cooperate with each other, where the power member is fixed to the bracket and the slide member is able to move along a preset track under the control of the power member;
a cutting blade arranged on the slide member, configured to move under the drive of the slide member, and able to cut the winding film during the movement; and
the controller is also configured to respond to the starting signal, and after the rotation driving component is controlled to stop rotating, to control the power member to drive the slide member to move along a preset track.

BRIEF DESCRIPTION OF THE DRAWINGS

The above-mentioned and other features and advantages of the present disclosure will become more apparent by describing example embodiments thereof in detail with reference to the accompanying drawings.

DETAILED DESCRIPTION

Figure 1:
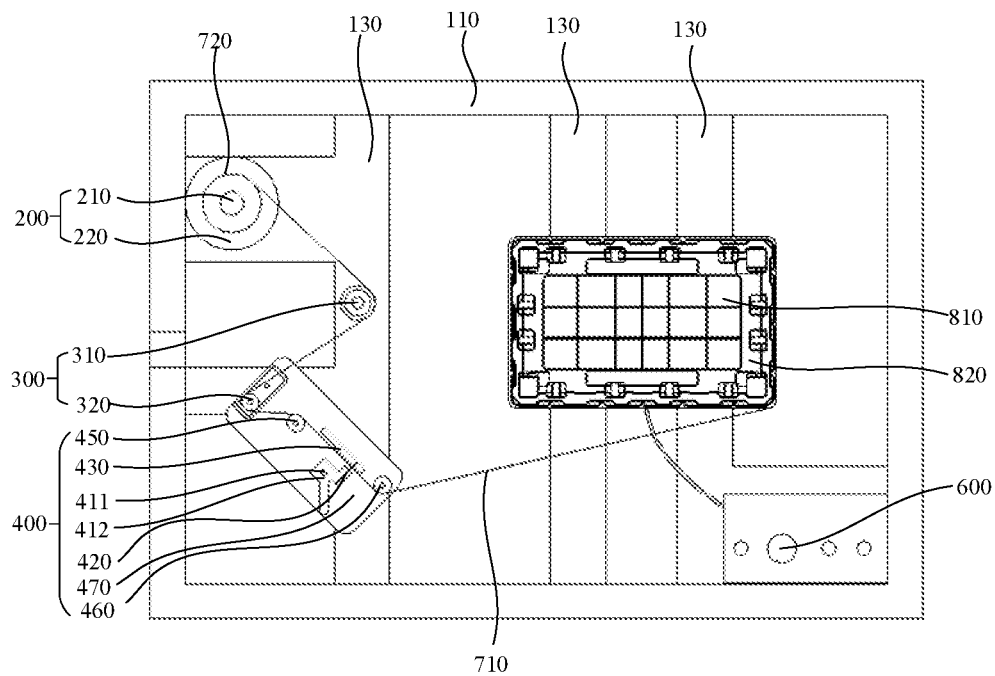
FIG. 1 is the top view of the structure diagram of the backlight source packaging device of the present disclosure.

Example embodiments will now be described more fully with reference to the accompanying drawings. However, the example embodiments can be embodied in many manners, and should not be understood as limited to the examples set forth herein. On the contrary, these embodiments are provided so that the present disclosure will be comprehensive and integrated, and the concept of the example embodiments is fully conveyed to those skilled in the art. The described features, structures, or characteristics may be combined in one or more embodiments in any suitable manner. In the following description, many specific details are provided so as to give a full understanding of the embodiments of the present disclosure.

In the drawings, the thickness of regions and layers may be exaggerated for clarity. The same reference numerals of the accompanying drawings denote the same or similar structure; thus, their detailed description will be omitted.

The described features, structures, or characteristics may be combined in one or more embodiments in any suitable manner. In the following description, many specific details are provided so as to give a full understanding of the embodiments of the present disclosure. However, those skilled in the art will realize that the technical solutions of the present disclosure may be practiced without one or more of the described specific details, or other methods, components, materials, etc. may be adopted. In other cases, well-known structures, materials, or operations are not shown or described in detail to avoid obscuring the main technical idea of the present disclosure.

When a structure is "on" the other structure, it may mean that a structure is integrally formed on the other structure, mean that a structure is "directly" arranged on the other structure, or mean that a structure is "indirectly" arranged on the other structure through another structure. When a component or device is "configured to" perform a function, it is understood that the component or the device may be "used to" perform the equivalent function.

Figure 2:
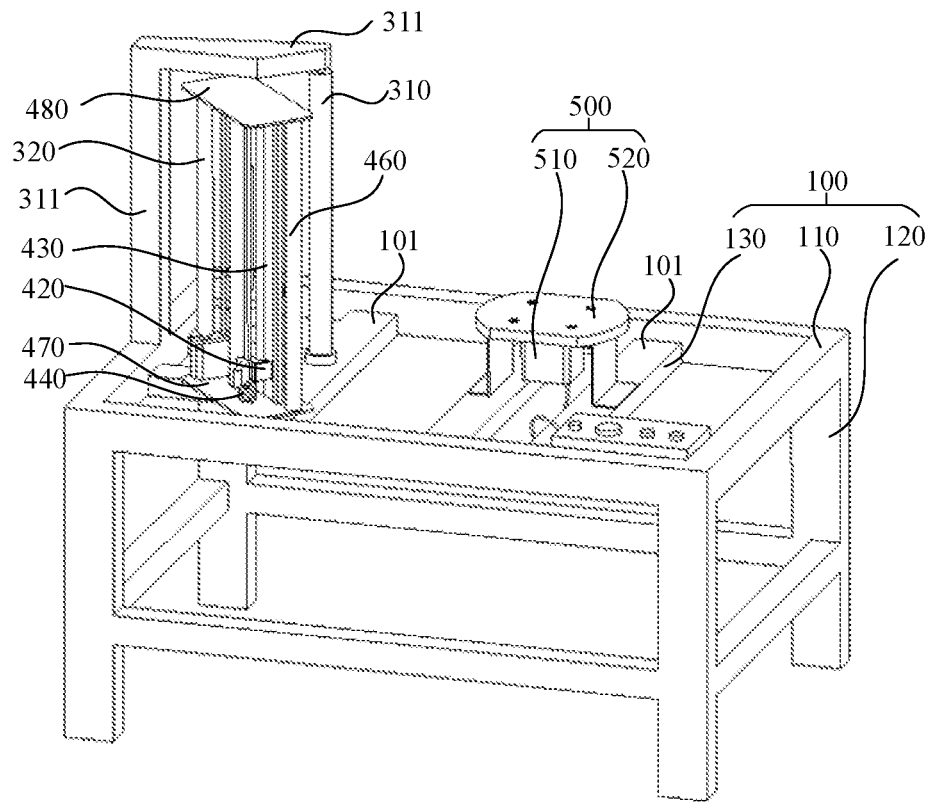
FIG. 2 is the perspective view of the structure diagram of the backlight source packaging device of the present disclosure.
Figure 3:
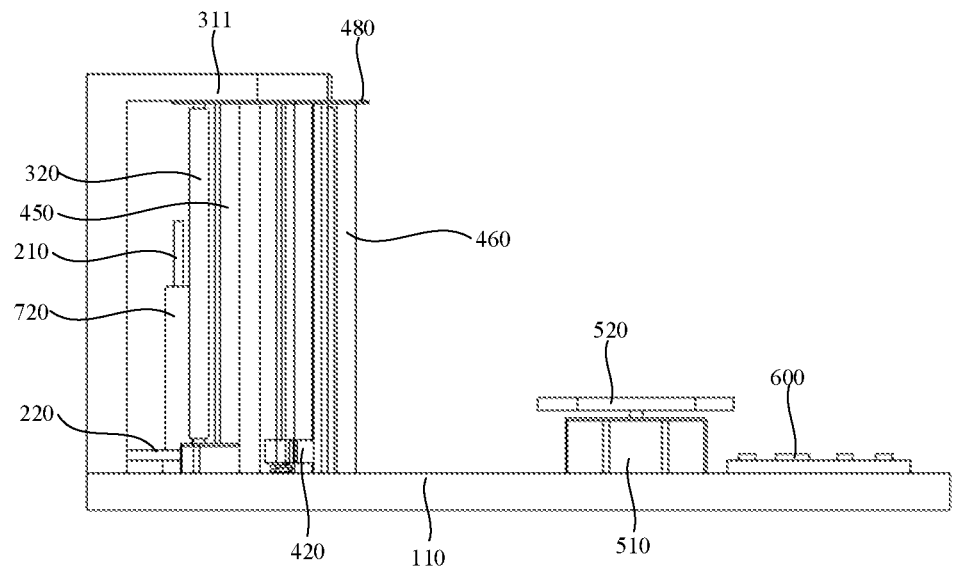
FIG. 3 is the side view of the structure diagram of the backlight source packaging device of the present disclosure.

A backlight source packaging device is provided in the embodiment of the present disclosure, as shown in FIG. 1 (the second pedestal and the connecting frame are not shown), FIG. 2, and FIG. 3. The backlight source packaging device includes a bracket 100, a feeding mechanism 200, a cleaning mechanism 300, a cutting mechanism 400, and a rotating mechanism 500, where, the feeding mechanism 200 is fixed to the bracket 100 and configured to arrange a winding film 710; the cleaning mechanism 300 is fixed to the bracket 100 and configured to clean the winding film 710; the cutting mechanism 400 is fixed to the bracket 100 and configured to cut off the winding film 710; and the rotating mechanism 500 is fixed to the bracket 100 and configured to drive the backlight source 810 to rotate so that the winding film 710 winds around the backlight source 810, where the winding film 710 can reach the rotating mechanism 500 from the feeding mechanism 200 successively through the cleaning mechanism 300 and the cutting mechanism 400.

According to the backlight source packaging device of the present disclosure, the winding film 710 can reach the rotating mechanism 500 from the feeding mechanism 200 successively through the cleaning mechanism 300 and the cutting mechanism 400, and the rotating mechanism 500 can drive the backlight source 810 to rotate so that the winding film 710 is wound around the backlight source 810 to realize the packaging of the backlight source 810. When the winding film 710 passes through the cleaning mechanism 300, the cleaning mechanism 300 can clean the winding film 710, which prevents the winding film 710 from carrying foreign matter to pollute the backlight source 810 or cause package stain and damage of the backlight source 810. After the winding process of the winding film 710 is completed, the cutting mechanism 400 can cut the winding film 710 so as to remove the packaged backlight source 810. Therefore, when using the backlight source packaging device to package the backlight source 810, the winding process of the winding film 710 is completed by the rotation of the rotating mechanism 500 without the cooperation of multiple people, and only one person can operate, greatly reducing manpower occupied during the backlight source 810 packaging and effectively improving the efficiency of the backlight source 810 packaging. Moreover, the winding process of the winding film 710 completed by the rotation of the rotating mechanism 500 can ensure the consistent packaging of the backlight source 810 in each batch, and reduce the packaging differences of the backlight source 810 in each batch.

Each component of the backlight source packaging device provided in the embodiments of the present disclosure will be described in detail in combination with the accompanying drawings:

The bracket 100 is configured to bear the weight of the feeding mechanism 200, the cleaning mechanism 300, the cutting mechanism 400, and the rotating mechanism 500, such that the positions among the various mechanisms are remained relatively stable.

In one embodiment, as shown in FIG. 2, in order to facilitate the mounting of the feeding mechanism 200, the cleaning mechanism 300, the cutting mechanism 400, and the rotating mechanism 500, the bracket 100 may provide a mounting plane 101, and the feeding mechanism 200, the cleaning mechanism 300, the cutting mechanism 400, and the rotating mechanism 500 may be directly or indirectly mounted on the mounting plane 101. The mounting plane 101 may be an entire plane, and may also be composed of a plurality of mutually spaced and coplanar small planes, which is subject to realizing the mounting of the feeding mechanism 200, the cleaning mechanism 300, the cutting mechanism 400, and the rotating mechanism 500, which is not specifically limited in the present disclosure.

For example, in an embodiment of the present disclosure, as shown in FIG. 2, the bracket 100 may include a rectangular supporting frame 110, and four corners of the rectangular supporting frame 110 are respectively connected with a support leg 120 extending in the same direction and with equal length. A plurality of supporting keels 130 may be arranged in the cavity of the rectangular supporting frame 110, and the surfaces of each supporting keel 130 away from the support leg 120 collectively constitute the mounting plane 101 of the bracket 100. When applied, the support leg 120 may be supported on the ground or other supports, so that the mounting plane 101 is horizontal or close to horizontal.

Figure 7:
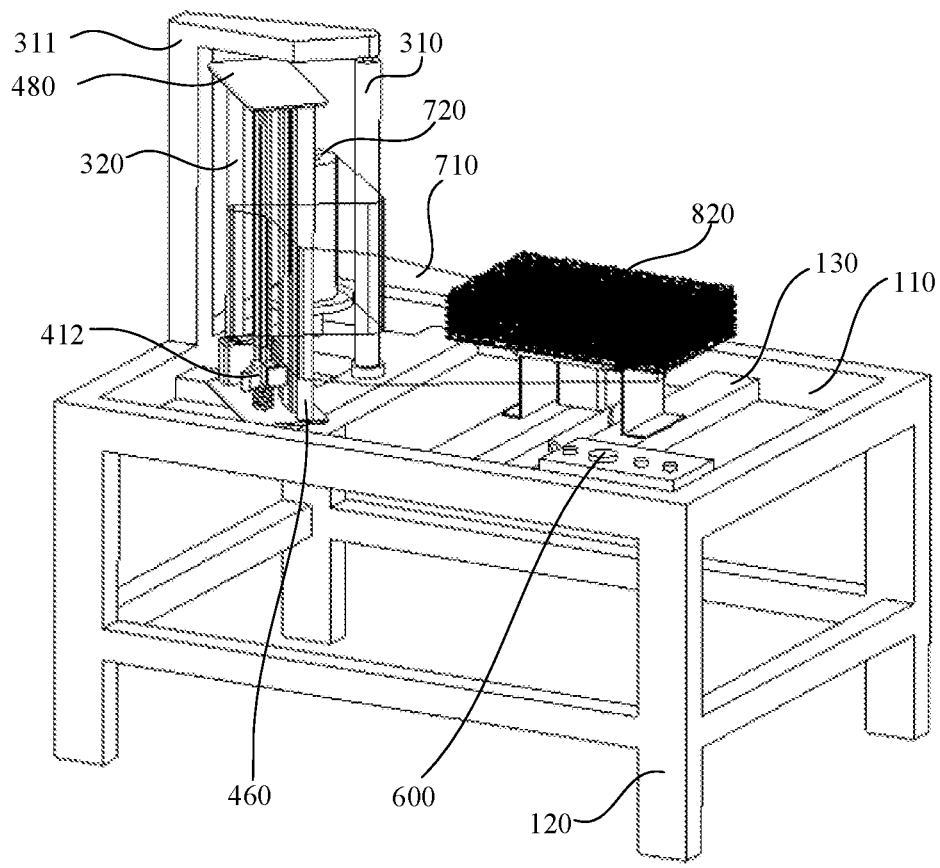
FIG. 7 is the perspective view of the structure diagram of the working condition of the backlight source packaging device of the present disclosure.

As shown in FIG. 1, the feeding mechanism 200 is configured to arrange the winding film 710, so that the arranged winding film 710 is provided to the rotating mechanism 500 successively through the cleaning mechanism 300 and the cutting mechanism 400. In one embodiment, as shown in FIG. 1, the winding film 710 may be wound on a cylinder 720 in advance, and the cylinder 720 wound with the winding film 710 may be arranged in the feeding mechanism 200 and can realize the rotation around the axis in the feeding mechanism 200. Thus, as shown in FIG. 7, when the rotating mechanism 500 rotates, the winding film 710 can pull the cylinder 720 to rotate during the process of being wound onto the backlight source 810 so as to provide the required winding film 710 for the rotating mechanism 500. In order to ensure that the winding film 710 provided by the feeding mechanism 200 can be fully unfolded, the axis of the cylinder 720 in the feeding mechanism 200 can be made parallel to the rotation axis of the rotating mechanism 500. For example, when the cylinder 720 wound with the winding film 710 is arranged in the feeding mechanism 200, the axis direction of the cylinder 720 may be a vertical direction and the rotation axis direction of the rotating mechanism 500 is a vertical direction.

Figure 4:
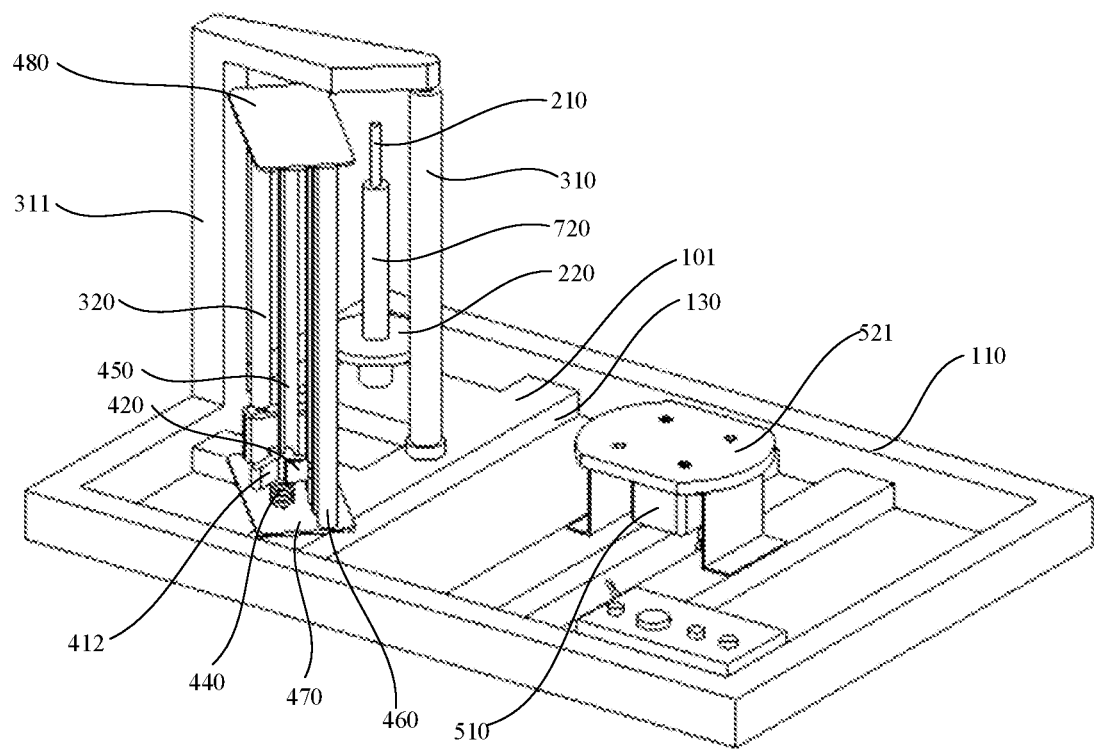
FIG. 4 is the partially perspective view of the structure diagram of the backlight source packaging device of the present disclosure.

In an embodiment of the present disclosure, as shown in FIG. 3 and FIG. 4, the feeding mechanism 200 may include a support shaft 210, where the support shaft 210 is fixed to the bracket 100, and can be threaded through the cylinder 720 wound with a winding film 710. Thus, the cylinder 720 can be sleeved on the support shaft 210, and when the rotating mechanism 500 pulls the winding film 710, the winding film 710 can pull the cylinder 720 to rotate with the support shaft 210 as the axis to realize the provision of the winding film 710 to the rotating mechanism 500 in real time. When the winding film 710 on the cylinder 720 is used up, the cylinder 720 can be removed and a new cylinder 720 wound with the winding film 710 can be sleeved on the support shaft 210 to complete the operation of supplying the winding film 710 to the feeding mechanism 200.

In one embodiment, as shown in FIG. 1 and FIG. 4, the support shaft 210 may be vertically arranged on the mounting plane 101 of the bracket 100 and extended in the direction away from the support leg 120, such that the unfolded winding film 710 is perpendicular to the mounting plane 101 of the bracket 100 to prevent the winding film 710 from being insufficiently unfolded. For example, the support shaft 210 may be fixed to the mounting plane 101 of the bracket 100, and may extend upward in the vertical direction. Furthermore, the support shaft 210 and the bracket 100 may be threadably connected, for example, by one or more bolts.

In one embodiment, a roller may be further provided on the support shaft 210, and the rotation axis of the roller is the same as the axis of the support shaft 210. Thus, the cylinder 720 can be sleeved on the roller and can drive the roller to rotate, which reduces the friction between the cylinder 720 and the feeding mechanism 200.

In one embodiment, as shown in FIG. 1 and FIG. 4, in order to prevent one end of the winding film 710 close to the bracket 100 from contacting the bracket 100, and to ensure that the winding film 710 is not polluted or damaged, the feeding mechanism 200 may further include a supporting seat 220. The supporting seat 220 is fixed to one end of the support shaft 210 close to the bracket 100 to support the cylinder 720, which makes the distance between the cylinder 720 and the bracket 100 be a preset distance. For example, the supporting seat 220 may be arranged at the lower end of the support shaft 210 and the distance from the bracket 100 is a preset distance. When the cylinder 720 is sleeved on the support shaft 210, the cylinder 720 cannot directly contact the bracket 100 and can maintain a distance from the bracket 100 due to the blocking of the supporting seat 220, thereby ensuring that the winding film 710 provided on the cylinder 720 also maintains a certain distance from the bracket 100 after being unfolded.

It should be understood that the structure of the above-mentioned feeding structure is only an exemplary description. In other embodiments of the present disclosure, the feeding mechanism 200 may also be other structures, as long as it can play the same role or perform an equivalent function, and is not described in detail herein.

Figure 5:
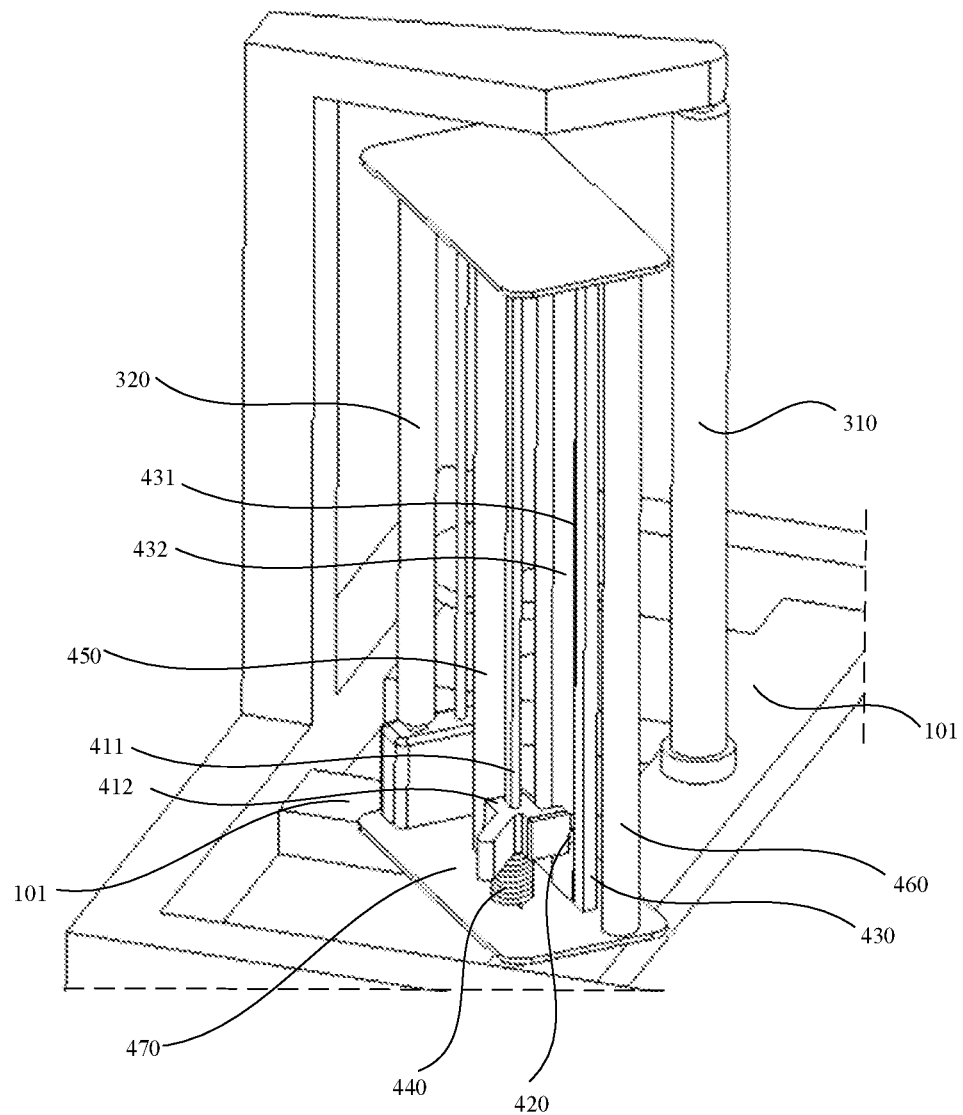
FIG. 5 is the perspective view of the structure diagram of the cutting mechanism of the backlight source packaging device of the present disclosure.

As shown in FIG. 1 and FIG. 5, the cleaning mechanism 300 is fixed to the bracket 100 and is configured to clean the unfolded winding film 710 to prevent the foreign matter from adhering the unfolded winding film 710 to cause the unclean packaging of the backlight source 810.

In an embodiment of the present disclosure, as shown in FIG. 1 and FIG. 5, the cleaning mechanism 300 may include an adhesion roller 310, where the adhesion roller 310 is rotatably fixed to the bracket 100, the adhesion roller 310 is configured to be in surface contact with the winding film 710 to adhere the foreign matter on the winding film 710, and is able to rotate under the drive of the winding film 710. Thus, when the winding film 710 is pulled by the rotating mechanism 500, the winding film 710 will be in surface contact with the adhesion roller 310 during the process of moving to the rotating mechanism 500, thereby the adhesion roller 310 can adhere the foreign matter on the unfolded winding film 710. The adhesion roller 310 can be adapted to rotate when the winding film 710 passes through, which can reduce the friction between the cleaning mechanism 300 and the unfolded winding film 710, and prevent the winding film 710 from being damaged when passing through the cleaning mechanism 300. Furthermore, in order to ensure the sufficient unfolding of the winding film 710, the rotation axis of the adhesion roller 310 may be parallel to the rotation axis of the rotating mechanism 500. Furthermore, in order to ensure that the adhesion roller 310 can effectively clean the winding film 710, the size of the adhesion roller 310 along the axis direction is larger than the width of the unfolded winding film 710.

For example, as shown in FIG. 1 and FIG. 5, the adhesion roller 310 is vertically and rotatably mounted on the mounting plane 101 of the bracket 100, and extends in a direction away from the support leg 120 of the bracket 100. The adhesion roller 310 may include a low viscosity selenium adhesive dust cylinder, and the base material of the low viscosity selenium adhesive dust cylinder may be a polycarbonate material. Low viscosity selenium glue is arranged on the surface of the low viscosity selenium adhesive dust cylinder, and the low viscosity selenium glue can adhere the foreign matter on the unfolded winding film 710. In the adhesion roller 310, the arranged height of the low viscosity selenium glue is not less than the width of the unfolded winding film 710 so as to ensure that the unfolded winding film 710 is sufficiently contacted with the low viscosity selenium glue.

In one embodiment, as shown in FIG. 1, the adhesion roller 310 can change the motion direction of the unfolded winding film 710, so as to ensure that there is a large stress between the unfolded winding film 710 and the adhesion roller 310, thereby ensuring that the adhesion roller 310 is able to effectively adhere the foreign matter on the unfolded winding film 710.

In one embodiment, as shown in FIG. 5, the cleaning mechanism 300 may further include a connecting frame 311 fixed to the bracket 100, and one end of the adhesion roller 310 away from the bracket 100 is rotatably fixed to the connecting frame 311. Thus, two ends of the adhesion roller 310 are respectively rotatably fixed to the bracket 100 and the connecting frame 311, and the adhesion roller 310 can be kept stable under the tension of the winding film 710.

In one embodiment, as shown in FIG. 1 and FIG. 5, the cleaning mechanism 300 may further include a static electricity eliminating roller 320, and the static electricity eliminating roller 320 may rotatably fixed to the bracket 100, which is configured to be in surface contact with the winding film 710 to eliminate the static electricity on the winding film 710, and is able to rotate under the drive of the winding film 710. Thus, after the unfolded winding film 710 passes through the cleaning mechanism 300, the static electricity thereof can be eliminated, thereby preventing the unfolded winding film from re-adsorbing other foreign matter through the static electricity, avoiding curling and sticking to each other due to the static electricity after being cut by the cutting mechanism 400, ensuring the cleaning of the unfolded winding film 710, and also improving the unfolding degree of the winding film 710 after being cut.

Furthermore, as shown in FIG. 1, the winding film 710 may pass from the feeding mechanism 200 successively through the adhesion roller 310 and the static electricity eliminating roller 320, and then through the cutting mechanism 400 and the rotating mechanism 500. That is, the unfolded winding film 710 can remove the foreign matter first, and then eliminate the static electricity to avoid the foreign matter contaminating the static electricity eliminating roller 320, and to ensure the static electricity elimination effect of the static electricity eliminating roller 320.

The cutting mechanism 400 is configured to cut the winding film 710, so that the winding film 710 wound on the backlight source 810 and the winding film 710 in the feeding mechanism 200 are separated from each other. The cutting mechanism 400 may cut the winding film 710 by thermal cutting, mechanical cutting, ultrasonic cutting, or other feasible cutting methods.

Figure 6:
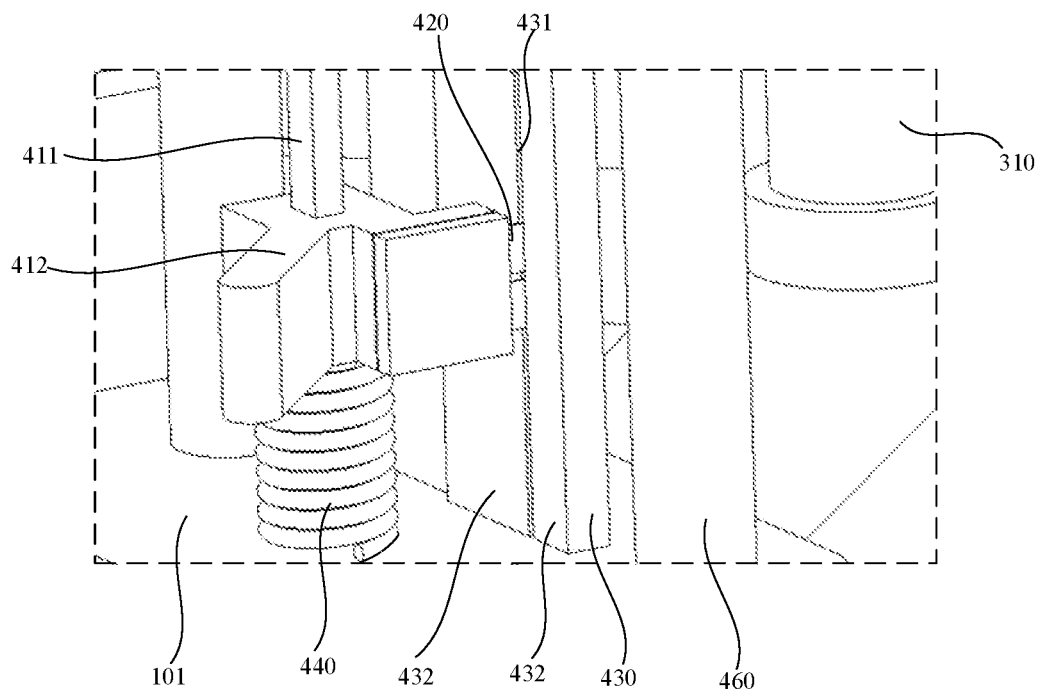
FIG. 6 is the perspective view of the structure diagram of the cutting blade of the backlight source packaging device of the present disclosure.

In an embodiment of the present disclosure, as shown in FIG. 1, FIG. 5, and FIG. 6, the cutting mechanism 400 may include a guide component and a cutting blade 420. The guide component includes a guide member 411 and a slide member 412, which cooperate with each other, and the guide member 411 is fixed to the bracket 100. The slide member 412 is able to move along a preset track under the constraint of the guide member 411. The cutting blade 420 is arranged on the slide member 412, and is configured to move under the drive of the slide member 412 and cut the winding film 710 during the movement.

Furthermore, as shown in FIG. 6, the guide member 411 can be a linear guide rail and the extension direction of the linear guide rail can be perpendicular to the mounting plane 101 of the bracket 100. The slide member 412 can be a slider which cooperates with the linear guide rail and, then, the preset movement track of the slider is along a linear direction perpendicular to the mounting plane 101 of the bracket 100. When the slider moves, the cutting blade 420 can be driven to move, thereby achieving cutting of the unfolded winding film 710 that passes through the cutting mechanism 400. Furthermore, in order to ensure that the cutting blade 420 can completely cut the winding film 710, the reciprocating motion range of the slider may be larger than the width of the winding film 710.

In one embodiment, the cutting blade 420 may be a double-edged blade.

In one embodiment, in order to facilitate manual control of the slider movement, the slider may also be arranged with a handle.

As shown in FIG. 6, in order to ensure that the winding film 710 maintains a tension state when passing through the cutting mechanism 400 to facilitate cutting of the winding film 710 by the cutting blade 420, the cutting mechanism 400 may further include a support plate 430, and the support plate 430 is fixed to the bracket 100, which is arranged with a support surface 432 for contacting with the winding film 710. The support plate 430 is further arranged with a narrow slit 431, where the narrow slit 431 divides the support surface 432 into two parts which are not connected. The cutting blade 420 is inserted into the narrow slit 431 and is movable within the narrow slit 431.

In one embodiment, the support surface 432 of the support plate 430 may be perpendicular to the mounting plane 101 of the bracket 100 to ensure that the support surface 432 of the support plate 430 can fully contact with the unfolded winding film 710, so that the winding film 710 is attached to the support surface 432 in a tension state. The narrow slit 431 of the support plate 430 may be perpendicular to the mounting plane 101 of the bracket 100, so as to cooperate with the movement track of the cutting blade 420.

In one embodiment, as shown in FIG. 6, the support surface 432 of the support plate 430 faces the slide member 412, such that the unfolded winding film 710 is located between the slide member 412 and the support plate 430, which ensures that the cutting blade 420 can completely cut the unfolded winding film 710.

In one embodiment, as shown in FIG. 6, one end of the cutting blade 420 away from the slide member 412 is inserted into the narrow slit 431 and does not penetrate the support plate 430. Thus, the support plate 430 can also protect the operator from being injured by the operator accidentally touching the cutting blade 420.

As shown in FIG. 6, in order to prevent the cutting blade 420 from being damaged by touching the bracket 100, and to reduce the vibration generated during cutting, the cutting mechanism 400 may further include a buffer member 440, and the buffer member 440 is arranged at one end of the guide member 411 close to the bracket 100, which is configured to isolate the slide member 412 and the bracket 100. The buffer member 440 may be a rubber member, a spring member, or other parts with buffer function. For example, the buffer member 440 may be a spring. One end of the spring is fixed to the bracket 100, and the other end extends in a direction away from the bracket 100 so as to support the slide member 412.

As shown in FIG. 1, in order to ensure that the unfolded winding film 710 can accurately pass through the cutting mechanism 400 and, in particular, to ensure that the unfolded winding film 710 can contact with the support surface 432 in a tensioned state, the cutting mechanism 400 may further include a first guide roller 450 and a second guide roller 460, where the first guide roller 450 and the second guide roller 460 are arranged on two sides of the slide member 412, respectively. The unfolded winding film 710 can pass from the cleaning mechanism 300 successively through the first guide roller 450, the gap between the support plate 430 and the slider, the second guide roller 460, and then reach the rotating mechanism 500.

In one embodiment, the extension direction of the first guide roller 450 and the second guide roller 460 may be perpendicular to the mounting plane 101 of the bracket 100, to ensure that the unfolded winding film 710 maintains a good unfolded state.

As shown in FIG. 5, in order to facilitate the installation of the cutting mechanism 400, the cutting mechanism 400 may further include a first pedestal 470, and at least one of the guide member 411, the support plate 430, the first guide roller 450 and the second guide roller 460 can be fixed on the first pedestal 470, and the first pedestal 470 can be fixed on the mounting plane 101 of the bracket 100. In one embodiment, the cutting mechanism 400 may further include a second pedestal 480, and one end of at least one of the guide member 411, the support plate 430, the first guide roller 450, and the second guide roller 460 away from the bracket 100 may be fixed on the second pedestal 480.

In an embodiment of the present disclosure, as shown in FIG. 5, one end of the guide member 411, the support plate 430, the first guide roller 450, and the second guide roller 460 is fixed on the first pedestal 470, and the other end is fixed on the second pedestal 480. The first pedestal 470 is fixed on the mounting plane 101 of the bracket 100. Thus, the cutting mechanism 400 can be removed and installed as a whole, which improves the maintainability of the backlight source packaging device. Not only this, two ends of the guide member 411, the support plate 430, the first guide roller 450, and the second guide roller 460 are respectively fixed on the first pedestal 470 and the second pedestal 480, such that the relative position relationship among the guide member 411, the support plate 430, the first guide roller 450, and the second guide roller 460 is kept stable, thereby ensuring good efficiency. Furthermore, one end of the static electricity eliminating roller 320 is rotatably fixed to the first pedestal 470 and the other end is rotatably fixed to the second pedestal 480, so as to ensure the cooperation between the static electricity eliminating roller 320 and the first guide roller 450.

Figure 8:
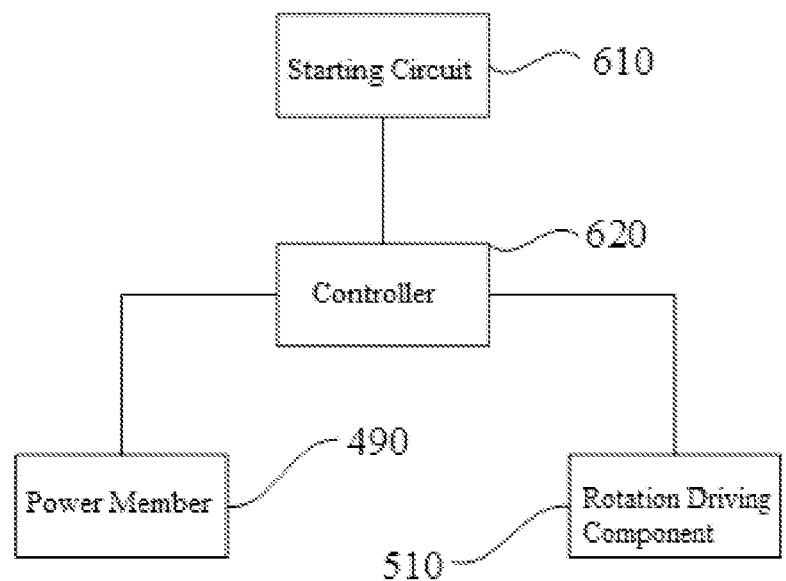
FIG. 8 is the structure diagram of the control circuit of the backlight source packaging device of the present disclosure.

As shown in FIG. 8, the cutting mechanism 400 may further include a power member 490 cooperating with the slide member 412, where the power member 490 is fixed to the bracket 100 and the slide member 412 can move along a preset track under the control of the power member 490. Thus, the power member 490 and the slide member 412 can cooperate with each other to form an elevator mechanism. The cutting blade 420 is arranged on the slide member 412, which is configured to move under the drive of the slide member 412 and is able to cut the winding film 710 during the movement. Thus, when the power member 490 is started and the power member 490 controls the slider 412 to move, the cutting blade 420 may cut the winding film 710.

In the elevator mechanism, the power member 490 may constrain the movement track of the slider, or may not constrain the movement track of the slider. For example, in an embodiment of the present disclosure, the elevator mechanism may be a linear motion mechanism which may include, for example, a leading screw slider mechanism arranged with a driving motor, where the leading screw connected with the driving motor may be used as the power member 490, and the slider matched with the leading screw may be used as the slider 412. Thus, the movement track of the slider 412 is constrained by the power member 490.

In another example, in another embodiment of the present disclosure, the elevator mechanism may also be a mechanism with no track constraints, for example, the power member 490 may be an electromagnet, and the slide member 412 may be arranged with a magnet. When the magnetic field is provided by the electromagnet, the slider 412 can be moved toward or away from the electromagnet. However, the electromagnet cannot constrain the movement track of the slider 412. At this time, the movement track of the slider 412 can be constrained by the guide member 411.

As shown in FIG. 2 and FIG. 3, the rotating mechanism 500 may include a rotation driving component 510 and a support platform 520, where the rotation driving component 510 is fixed to the bracket 100, which is configured to provide a torque required for rotation to the support platform 520. The support platform 520 is fixed to the rotation driving component 510, and is able to rotate under the control of the rotation driving component 510. The support platform 520 has a bearing surface 521 for bearing the backlight source 810. Thus, after the backlight source 810 is placed on the bearing surface 521, and one end of the winding film 710 extended to the rotating mechanism 500 is fixed to the backlight source 810, the rotation driving component 510 can be controlled to rotate, thereby driving the support platform 520 to rotate and driving the backlight source 810 to rotate, thus the winding film 710 is wound on the backlight source 810.

In one embodiment, the rotation driving component 510 may be an electric motor and the housing of the electric motor may be fixed to the mounting plane 101 of the bracket 100. Also, the rotation axis of the electric motor may be connected with the support platform 520. In order to ensure that the winding film 710 remains unfolded when being wound, the axis direction of the rotation axis of the electric motor may be perpendicular to the mounting plane 101 of the bracket 100, and the bearing surface 521 may be parallel to the mounting plane 101 of the bracket 100.

As shown in FIG. 8, the backlight source packaging device may further include a control circuit, where the control circuit may include a starting circuit 610 and a controller 620. The starting circuit 610 is configured to generate a starting signal in response to external operations. The controller 620 is configured to respond to the starting signal to control the rotation driving component 510 to drive the support platform 520 to rotate for a preset number of turns and then stop rotating.

In one embodiment, the starting circuit 610 may include a switch electrically connected with the controller 620. When the switch is closed, a starting signal is generated by the starting circuit 610 and is transmitted to the controller 620. Furthermore, the switch may be a switch button 600.

The controller 620 may be a PLC, an MCU, or a CPU, which may be electrically connected with the rotation driving component 510. After the controller 620 receives the starting signal, the rotation driving component 510 may be controlled to rotate, and after the rotation driving component 510 rotates for a preset number of turns, the rotation driving component 510 may be controlled to stop rotating. Thus, the controller 620 may control the same number of turns of the winding film 710 wound on the backlight source 810 in each batch, thereby unifying the packaging standard of the backlight source 810.

In one embodiment, the controller 620 may control the rotation driving component 510 to drive the support platform 520 to rotate for three turns and then stop rotating.

In one embodiment, the controller 620 may also be configured to respond to the starting signal, and after the rotation driving component 510 is controlled to stop rotating, the power member 490 is controlled to drive the slider 412 to move along a preset track.

Thus, after the operator places the backlight source 810 on the bearing surface 521 and fixes one end of the winding film 710 extending toward the rotating mechanism 500 to the backlight source 810, the starting circuit 610 generates the starting signal through the external operation (such as pressing the switch button 600), and the controller 620 may automatically control the rotation driving component 510 to rotate so as to wind the winding film 710 onto the backlight source 810, and automatically control the rotation driving component 510 to stop rotating so as to control the layer numbers of the winding film 710 wound on the backlight source 810. Also, after the winding is finished, the cutting mechanism 400 is automatically controlled to cut the winding film 710. Thus, the backlight source packaging device completes the automatic winding of the backlight source 810 and the automatic cutting of the winding film 710, which further improves the packaging efficiency of the backlight source 810.

In one embodiment, as shown in FIG. 1 and FIG. 7, the backlight source 810 may be placed in a support frame 820 (or tray) in advance, and then placed on the bearing surface 521 for packaging to avoid damage of the backlight source 810. Furthermore, the backlight source 810 may be placed in the support frame 820 first, and then the support frame 820 on which the backlight source 810 is placed is successively stacked (or piled) on the support platform 520. The number of piled layers can be determined according to the height of the backlight source 810, and generally five to eight layers can be piled, and then a support frame 820 without the backlight source 810 can be placed on the uppermost layer, and then the support frame 820 and the backlight source 810 on the support platform 520 can be wound and packaged through the winding film 710.

It should be understood that the present disclosure does not limit the application thereof to the detailed structure and arrangement form of the components proposed in the present specification. The present disclosure is capable of other embodiments and of being realized and carried out in various ways. The aforementioned deformation forms and modification forms fall within the scope of the present disclosure. It should be understood that the present disclosure disclosed and defined by the present specification extends to all alternative combinations of two or more than two separate features mentioned or apparent in the text and/or accompanying drawings. All of these different combinations constitute multiple alternative aspects of the present disclosure. The embodiments described in the present specification illustrate the best manners known for implementing the present disclosure and will enable those skilled in the art to utilize the present disclosure.

What is claimed is:

1. A backlight source packaging device, comprising:
   a bracket;
   a feeding mechanism fixed to the bracket, configured to arrange a winding film;
   a cleaning mechanism fixed to the bracket, configured to clean the winding film;
   a cutting mechanism fixed to the bracket, configured to cut the winding film; and
   a rotating mechanism fixed to the bracket, configured to drive a backlight source to rotate so that the winding film winds around the backlight source;
   wherein the winding film can reach the rotating mechanism from the feeding mechanism successively through the cleaning mechanism and the cutting mechanism, and
   the cleaning mechanism comprises:
   an adhesion roller rotatably fixed to the bracket, configured to be in surface contact with the winding film to adhere a foreign matter on the winding film, and being configured to rotate under the drive of the winding film, wherein the adhesion roller comprises a low viscosity selenium adhesive dust cylinder, and low viscosity selenium glue is arranged on a surface of the low viscosity selenium adhesive dust cylinder.

2. The backlight source packaging device according to claim 1, wherein, the feeding mechanism comprises:
   a support shaft fixed to bracket, and configured to be threaded through a cylinder wound with the winding film; and
   a supporting seat fixed to one end of the support shaft close to the bracket to support the cylinder, making the distance between the cylinder and the bracket to be a preset distance.

3. The backlight source packaging device according to claim 1, wherein the cleaning mechanism further comprises:
   a static electricity eliminating roller, being rotatably fixed to the bracket, being configured to be in surface contact with the winding film to eliminate a static electricity on the winding film, and being able to rotate under the drive of the winding film.

4. The backlight source packaging device according to claim 1, wherein the cutting mechanism comprises:
   a guide component comprising a guide member and a slide member which cooperate with each other, wherein the guide member is fixed to the bracket and the slide member is able to move along a preset track under the constraint of the guide member; and
   a cutting blade arranged on the slide member, configured to move under the drive of the slide member and cut the winding film during the movement.

5. The backlight source packaging device according to claim 4, wherein the cutting mechanism further comprises:
   a support plate fixed to the bracket, being arranged with a support surface configured to contact with the winding film;
   the support plate being further arranged with a narrow slit, and the narrow slit dividing the support surface into two parts which are not connected; and
   wherein the cutting blade is inserted into the narrow slit and is movable within the narrow slit.

6. The backlight source packaging device according to claim 4, wherein the cutting mechanism further comprises:
   a buffer member, being arranged at one end of the guide member close to the bracket, configured to isolate the slide member and the bracket.

7. The backlight source packaging device according to claim 1, wherein the rotating mechanism comprises:
   a rotation driving component fixed to the bracket; and
   a support platform fixed to the rotation driving component, and configured to rotate under the control of the rotation driving component, the support platform having a bearing surface for bearing the backlight source.

8. The backlight source packaging device according to claim 7, wherein the backlight source packaging device further comprises:

a starting circuit configured to generate a starting signal in response to external operations; and a controller configured to respond to the starting signal and control the rotation driving component to drive the support platform to rotate for a preset number of turns and then stop rotating.

9. The backlight source packaging device according to claim 8, wherein the cutting mechanism comprises:

an elevator mechanism comprising a power member and a slide member which cooperate with each other, wherein the power member is fixed to the bracket, and the slide member is able to move along a preset track under the control of the power member; and a cutting blade arranged on the slide member, configured to move under the drive of the slide member, and being configured to cut the winding film during the movement;

wherein the controller is further configured to respond to the starting signal, and after the rotation driving component is controlled to stop rotating, to control the power member to drive the slide member to move along a preset track.

* * * * *